Patented Mar. 2, 1954

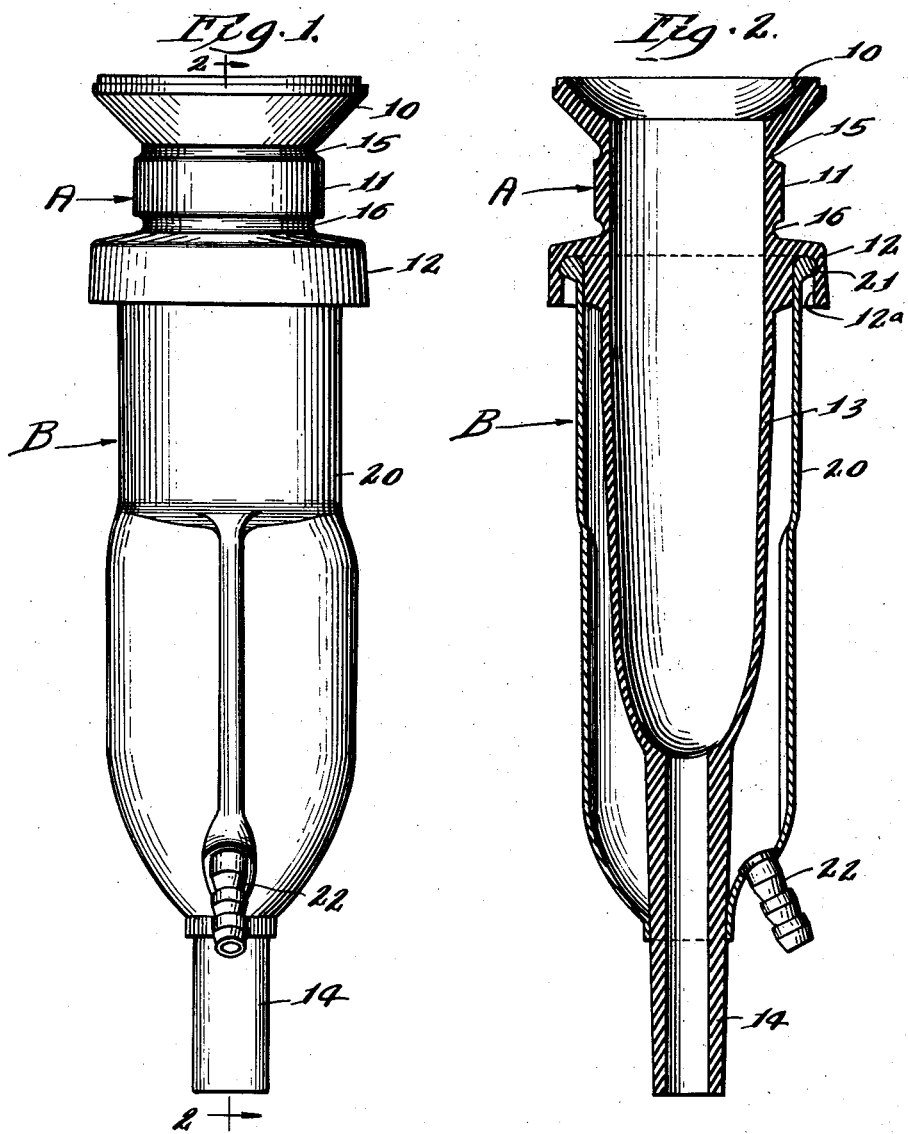

2,670,709

UNITED STATES PATENT OFFICE 2,670,709

INFLATION FOR MILKERS

Jacob J. Stampen, Hollywood, Ill., assignor to Babson Bros. Co., a corporation of Illinois Application February 7, 1950, Serial No. 142,869

4 Claims. (Cl. 119—14.52)

This invention relates to an inflation for a milker and more particularly to the inner element of a teat cup assembly for a double acting milking machine.

One feature of this invention is that it provides an improved inflation for milking machines of the double acting type; another feature of this invention is that the inflation seals more readily and more quickly over a wider range of teat sizes; yet another feature of this invention is that there is a relatively soft preferably flared top section adapted to engage the floor of the udder around the teat to provide an immediate effective seal on a small teated milk animal; yet another feature of this invention is the provision of a relatively rigid or hard portion immediately below the top of the inflation tending to make the uppermost part of the teat swell out and maintain the upper part of the teat canal open; and another feature of this invention is the provision of a shell receiving portion spaced from the top of the inflation to provide a working part such that all flexing takes place at and around the part of the teat slightly removed from the somewhat restricted canal opening into the udder proper.

Other features and advantages of this invention will be apparent from the following specification and the drawings in which:

Figure 1 is a vertical elevational view of a teat tube assembly embodying my invention; Figure 2 is a vertical sectional view along the line 2—2 of Figure 1; and Figure 3 is a top plan view of the inflation.

In milking a milk animal, as a cow, by a milking machine, vacuum is applied to the opening at the lower end of the teat to draw milk out of the teat and out of the cistern or reservoir immediately above the teat in the lower part of the udder. In order to provide stimulation and prevent injury to the teat and udder, it is desirable to compress and release the teat periodically. This is accomplished in present commercial milking machines by providing a teat cup assembly having a flexible inner element (generally termed an inflation) provided with a milk tube communicating with and discharging milk into the interior of the milker bucket; and by enclosing the inflation in a rigid shell or outer member and alternately providing conditions of vacuum and atmospheric pressure within the shell but outside the inflation. When the vacuum applied to the outside of the inflation is at least equal to and preferably somewhat greater than that existing on the inside, the inflation expands and the vacuum acting upon the end of the teat through the milk discharge tube withdraws milk therefrom. On the other hand when atmospheric pressure is present in the shell to the outside of the inflation and vacuum is present within the inflation, the pressure differential results in the inflation squeezing inwardly and closing off the milk flow for a period. This period of cessation of milk flow (generally termed the "rest" period) permits the reservoir to refill with milk from the tubes and ducts in the udder structure, and temporarily relieves the vacuum pull tending to congest blood circulation in the teat. The "giving down" of milk from the upper portions of the udder is encouraged by the stimulus of the mechanical gripping and releasing of the teat, coupled with other stimuli which may be applied by hand or by certain types of machines.

The alternating rest and milking portions of the cycle are normally repeated at a rate generally in the neighborhood of 40 or 50 cycles per minute, alternate operation at such a rate being effected automatically by a portion of the milking machine termed a "pulsator." This principle of applying vacuum not only to the interior of the milk tube (and thus to the end of the teat) but also at least partly to the outside of the inflation is termed "double action" milking, and has been the conventional commercial method of milking machine operation for over three decades. Inasmuch as machines of this type are well known, they and their general method of operation will not be illustrated or further described here. If it is desired to supplement the present description, reference may be had, for example, to McCornack Patent 1,859,213 which discloses a commercial type of milking machine of a character which I prefer to use. It will be understood, however, that my present inventions are not limited to use in a milking machine of the suspended type as shown in the above-mentioned patent, but that they are adapted for use in and provide improvements in milking machines of the floor type and other conventional types.

In the particular embodiment of my invention illustrated herewith, one teat cup assembly (four assemblies of this type would be used with each machine) is illustrated as comprising an inflation, here identified in general as A, having the major portion thereof received within a shell, here identified in general as B. The inflation has a lower integral stem portion 14 operating as a milk tube.

It will be understood that the reference to the McCornack patent is merely as to general characteristics and basic principles of operation as the present teat cup assembly, and particularly the inflation thereof, constitute improvements over those heretofore used.

The inflation A which may be of flexible material, such as natural or synthetic rubber, comprises a relatively soft flared upper end portion here identified as 10; a relatively non-collapsible or rigid ring part 11 immediately therebeneath; a second relatively rigid ring part 12 immediately beneath the first ring part, this part 12 being provided with a groove or recess 12a adapted to receive the rim 21 at the top of the generally cylindrical shell 20 of suitable rigid material, as metal; a relatively flexible and readily collapsible generally cylindrical "working part" or body portion 13; and an integral reduced stem portion 14 providing the milk tube. The stem portion is adapted to be slipped over a nipple on a lid of a milker of the suspended type, as shown in the above mentioned patent, or onto the connector nipple of a claw of a machine of the floor type, for example. As vacuum is always present in the bucket during the milking operation, vacuum always exists in the interior of the stem portion 14 and is thus applied to the lower end of the teat which would lie well down into the working part 13 of the inflation.

The shell is provided with a connector nipple 22 adapted to receive a vacuum hose leading from the pulsator. When the parts are assembled, as may be best seen in Figure 2, vacuum and air pressure alternate in the space between the interior of the shell and the exterior of the working part of the inflation. This causes the inflation alternately to collapse and expand in this portion at a rate determined by the rate of pulsator operation to effect the desired rest and milking periods during the milking.

Referring now more particularly to the inflation and its action, the relatively soft flared portion 10 is adapted to engage the udder floor immediately upon the assembly being shoved up over the teat, except possibly in the case of the very largest teats. With teats ranging anywhere from moderately large down to quite small, moving the tube up into place causes the flared portion to engage the udder floor and effect an instantaneous seal. Once the engagement is made and the seal effected, a normal teat is expanded by the pull of the vacuum within the inflation until it engages the relatively non-collapsible ring portions to effect a further seal. In the case of a very large teated animal where the teat rather tightly fills the inflation before the flared portion touches the udder floor, a good seal is still made substantially instantaneously and the uppermost part of the teat canal is still protected from any constricting force. In order to assist in the making of a seal in such a case, and to provide some slight longitudinal flexibility improving the tugging action in a suspended milker of the kind described in the above mentioned McCornack patent, I prefer to provide relatively flexible thin walled portions 15 and 16 above and below the relatively non-collapsible ring portion 11. With a teat of normal or large size these form in slightly under the vacuum pull, once a seal has been effected anywhere to provide not only a better vacuum seal but also a better mechanical hold on the teat during the tug and pull action which is so desirable during milking.

The improved inflation construction not only has the advantages discussed heretofore, but also obviates the need of any undercut or inwardly extending portion at the top of the inflation, permitting a uniform interior diameter to be used from the top opening down to the inwardly curving portion which joins with the stem. This is very advantageous in facilitating cleaning of the interior of the inflation, something which must be done after each milking.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A flexible inflation for use in a teat cup shell of a milker, comprising a body portion having a relatively soft flared end at the top thereof and a relatively non-collapsible ring part immediately therebeneath and a second ring part beneath said first ring part and adapted to grippingly engage the top bead of said shell, there being a relatively thin-walled part between said first and second ring parts.

2. A flexible inflation for use in a teat cup shell of a milker, comprising a body portion having a relatively soft flared end at the top thereof, a ring part substantially longitudinally spaced beneath said end and adapted to grippingly engage the top bead of said shell and a relatively non-collapsible ring part intermediate said end and said first mentioned ring part.

3. A flexible inflation for use in a teat cup shell of a milker, comprising a body portion having a relatively soft flared end at the top thereof, a first relatively non-collapsible ring part longitudinally spaced therebeneath, a thin-walled part between said flared end and said first ring part, a second ring part longitudinally spaced beneath said first ring part and adapted to grippingly engage the top bead of said shell, and a relatively thin-walled part between said first and second ring parts.

4. A flexible inflation for use in a teat cup shell of a milker, comprising a body portion having a flared end at the top thereof, a ring part substantially longitudinally spaced beneath said end and adapted to grippingly engage the top bead of said shell and a relatively non-collapsible part intermediate said end and said first mentioned ring part and extending around the body portion.

JACOB J. STAMPEN.

References Cited in the file of this patent

UNITED STATES PATENTS

| Number | Name | Date |
|---|---|---|
| 952,122 | Lane | Mar. 15, 1910 |
| 980,968 | Klein | Jan. 10, 1911 |
| 1,220,172 | Berthelsen | Mar. 27, 1917 |
| 2,462,583 | Weiby | Feb. 22, 1949 |
| 2,541,988 | Cyphers | Feb. 20, 1951 |

FOREIGN PATENTS

| Number | Country | Date |
|---|---|---|
| 394,983 | Great Britain | July 5, 1933 |